FERROELECTRIC CERAMIC COMPOSITION

Filed Aug. 11, 1955

INVENTORS
FRANK KULCSAR
CLARENCE G. CMOLIK
BY Francis [signature]
ATTORNEY

United States Patent Office 2,906,710 Patented Sept. 29, 1959

2,906,710

FERROELECTRIC CERAMIC COMPOSITION

Frank Kulcsar, Fairview Park, and Clarence G. Cmolik, Parma, Ohio, assignors to Clevite Corporation, Cleveland, Ohio, a corporation of Ohio Application August 11, 1955, Serial No. 527,720

15 Claims. (Cl. 252—62.9)

This invention relates to ferroelectric materials and articles of manufacture such as electromechanical transducers comprising such materials as their active elements. More particularly, the invention pertains to polycrystalline ceramic materials having their principal constituent selected from the binary systems (1) lead titanate-lead zirconate and (2) lead titanate-lead stannate and the ternary system lead zirconate-lead titanate-lead stannate.

Because of their potentially lower cost and their greatr durability under adverse atmospheric conditions, ferroelectric ceramic materials have come into prominence in recent years as substitutes for crystals in various transducer applications in the production, measurement and/or sensing of sound, shock, vibration, pressures, etc. Among the more promising ceramics for this purpose is lead zirconate-titanate, a polycrystalline material composed of $PbZrO_3$ and $PbTiO_3$ effectively in solid solution. In certain ranges of composition on the basis of mole percentages of its constituents, lead zirconate titanate exhibits highly desirable electrical and mechanical properties, particularly, when electrostatically polarized, a high electromechanical coupling. These ranges and examples of preferred compositions and their properties are disclosed with particularity in U.S. Letters Patent No. 2,708,244, issued on May 10, 1955, to Bernard Jaffe.

Similar to lead zirconate titanate in structure and properties are materials from the binary system $PbSnO_3$—$PbTiO_3$ and the ternary system $PbZrO_3$—$PbTiO_3$—$PbSnO_3$. Within certain ranges hereinafter set forth, members of these systems also display marked ferroelectric properties rendering them useful in the same general fields of application as the lead zirconate titanate ceramics. A large number of such compositions from the lead zirconate-lead titanate-lead stannate and lead stannate-lead titanate systems are disclosed in National Bureau of Standards Report No. 3684 (Jaffe, Roth and Marzullo, Report No. 9, October 1, 1954), entitled "Improvements in Piezoelectric Ceramics."

The present invention contemplates improved piezoelectric polycrystalline ceramics consisting essentially of solid solutions of lead titanate; at least one other lead compound selected from the group consisting of lead zirconate and lead stannate; and additions of calcium and/or strontium which, in the aggregate, are substituted for about 1 to 30 atom percent of the lead in the lead titanate, zirconate and/or stannate. It has been discovered that, in these novel compositions, adjustment and selective improvement of various physical and electrical properties are possible by variation in certain compositional parameters as hereinafter set forth with particularity. The invention also encompasses articles of manufacture, such as electromechanical transducers, utilizing these novel compositions.

It is, therefore, the fundamental object of the present invention to provide novel and improved piezoelectric ceramic materials.

A more specific object of the invention is to provide improved polycrystalline ceramics characterized by high relative permittivity and piezoelectric response.

Another object of the invention is the provision of novel piezoelectric ceramic compositions, certain properties of which can be adjusted to suit various applications.

It is a further object of the invention to provide new and useful ferroelectric ceramic materials characterized by high relative permittivity, high electromechanical coupling and a low dissipation factor.

A still further object of the invention is the provision of improved electromechanical transducers utilizing, as the active elements, an electrostatically polarized body of the novel ceramic compositions alluded to above and hereinafter described and claimed.

These and other objects of the invention and the manner of their attainment will be readily apparent to those conversant with the art from a reading of the following description and subjoined claims in conjunction with the annexed drawing, in which, Fig. 1 is a perspective elevational view of an electromechanical transducer embodying the present invention;

Figure 1:
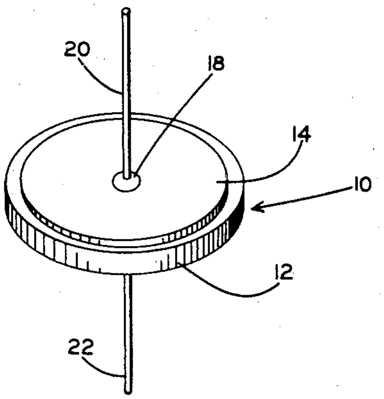

Before proceeding with a detailed description of the ferroelectric materials contemplated by the invention, their application in electromechanical transducers will be described with reference to Figures 1 and 2 of the drawings wherein reference character 10 designates as a whole an electromechanical transducer having, as its active element, a preferably disc shaped body 12 of piezoelectric ceramic material according to the present invention.

Body 12 is electrostatically polarized, in a manner hereinafter set forth, and is provided with a pair of electrodes 14 and 16, applied in a suitable manner, on two opposed surfaces thereof. Conductively attached to the electrodes 14 and 16, as by solder 18, are respective wire leads 20 and 22 operative to connect the transducer in the electrical or electronic circuit, not shown, in which it is to be employed. As well known in the art, an electromechanical transducer operates to convert applied electrical energy to mechanical energy, and vice versa. Therefore, if the ceramic body is subjected to mechanical stresses, the resulting strain generates an electrical output appearing as a voltage across the leads 20, 22. Conversely, a voltage applied across the leads produces a strain or mechanical deformation of ceramic body 12. It is to be understood that the term electromechanical transducer as used herein is taken in its broadest sense and includes piezoelectric filters, frequency control devices, and the like, and that the invention may also be used and adapted to various other applications requiring materials having dielectric, piezoelectric and/or electrostrictive properties.

According to the present invention, the ceramic body

Figure 2:
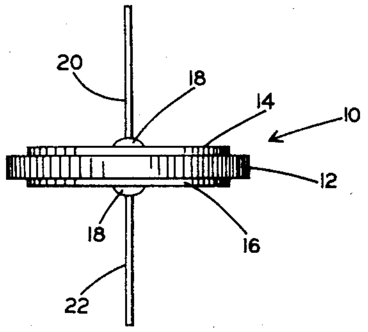
Fig. 2 is a side elevational view of the transducer shown in Fig. 1.

12, Figures 1 and 2, is formed of novel and improved piezoelectric compositions which, as briefly set forth hereinabove, are polycrystalline ceramics composed of lead titanate effectively in solid solution with either lead zirconate or lead stannate, or both, and also containing substantial quantities, hereinafter specified, of either or both of the alkaline earth metals strontium and calcium substituting for part of the lead of said lead titanate and zirconate and/or stannate. Inasmuch as, in the operative ranges, the total quantity of the lead compounds exceeds that of the alkaline earth elements, the former will be termed the principal constituents or basic compositions while the latter will be considered and referred to as additions.

From the foregoing, it will be appreciated that the basic compositions fall into three categories: (1) those belonging to the binary system lead zirconate-lead titanate; (2) those belonging to the binary system lead stannate-lead titanate; and (3) those belonging to the ternary system lead zirconate-lead stannate-lead titanate. The designations binary and ternary are used in conjunction with the base materials and in disregard of the alkaline earth additions.

Furthermore, as will be appreciated by those conversant with the art, hafnium occurs as an impurity in varying amounts in zirconium; for the purposes of the invention, hafnium may be regarded as the substantial equivalent of zirconium and the presence of hafnium either as an impurity or as a substituent for zirconium is acceptable. However, because the high relative cost of hafnium as compared to zirconium renders its use uneconomic in commercial manufacture of the compositions under discussion, the present description will disregard the possible presence of hafnium.

Figure 3:
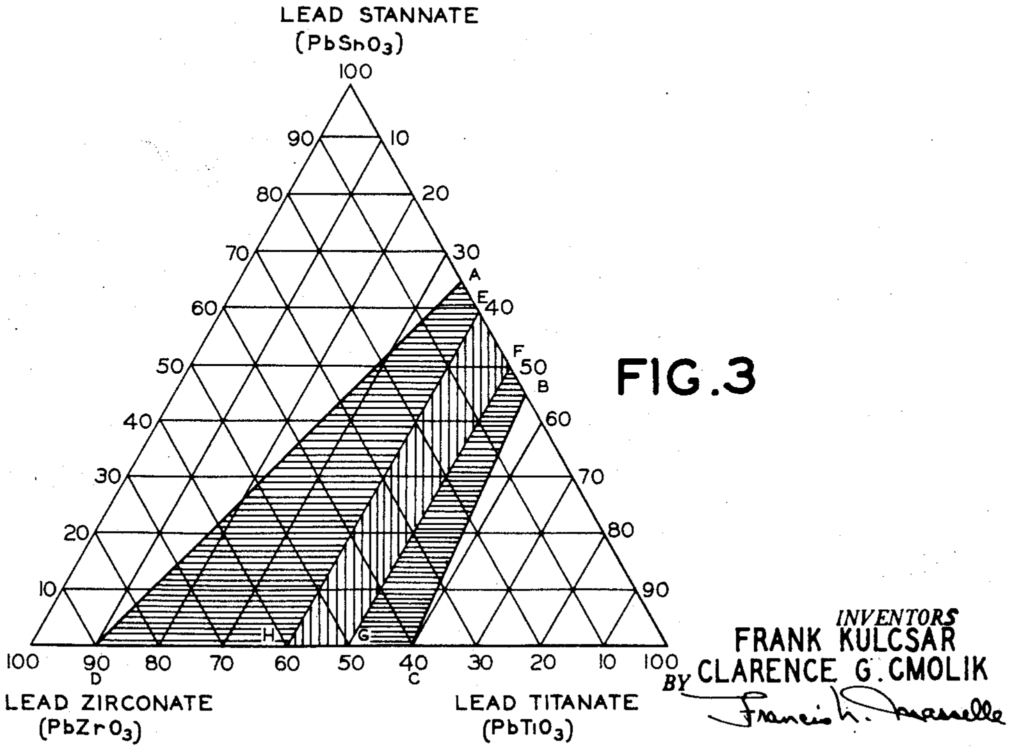
Fig. 3 is a triangular compositional diagram of materials utilized in the present invention.

All possible compositions coming within all three of the systems defined above are represented by the triangular diagram constituting Figure 3 of the drawings. All compositions represented by the diagram, however, are not ferroelectric, and many are electromechanically active only to a very slight degree. The present invention is concerned only with those compositions exhibiting piezoelectric response of appreciable magnitude. As a matter of convenience, the radial coupling, $k_r$ (also known as planar coupling $k_p$ and disc coupling $k_{disc}$), of test discs will be taken as a measure of piezoelectric activity. Thus, within the horizontally hatched area bounded by lines connecting points ABCD, Figure 3, all compositions polarized and tested showed a radial coupling of at least 10%. The area bounded by ABCD includes binary lead zirconate-lead titanate solid solutions lying on the line DC along which the mole ratio ($PbZrO_3$:$PbTiO_3$) of the end components varies from 90:10 to 40:60. Among these base line compositions those falling between points H and G have characteristically higher radial couplings with the highest couplings occurring where the $PbZrO_3$:$PbTiO_3$ ratio is around 53:47 or 54:46.

The binary compositions on line AB ($PbSnO_3$:$PbTiO_3$ from 65:35 to 45:55) of the Figure 3 diagram are similar to those on line DC in structure but are characterized by generally lower radial couplings with the best couplings occurring in compositions falling between points E and F, i.e., with the mole ratio $PbSnO_3$:$PbTiO_3$ in the range 60:40 to 50:50.

In the ternary compositions within the area designated ABCD, the inclusion of $PbSnO_3$ as a substituent for a portion of the $PbZrO_3$ in the base line compositions has the effect of progressively lowering the Curie temperature but the compositions retain a relatively high radial coupling, particularly in the area of the diagram bounded by lines connecting points EFGH.

In accordance with the present invention, novel and improved ferroelectric ceramic compositions may be obtained by formulating compositions wherein calcium and/or strontium replace a part of the lead in solid solutions selected from the area ABCD or, preferably EFGH, of the Figure 3 diagram. The substitution of strontium and/or calcium for lead is on an atom percentage basis with a minimum effective quantity of about 1 atom percent, a maximum of about 30, and a preferred range of about 5 to 15. The effect of the strontium and calcium additions, hereinafter more fully described, is qualitatively the same but, in equal amounts, strontium produces a more pronounced effect.

The compositions proposed may be prepared in a variety of ways perhaps the most obvious of which is by direct combination of the ingredients. A preferred method, however, hereinafter more fully described, consists in the use of lead oxide (PbO), titania ($TiO_2$), and zirconia ($ZrO_2$) and/or stannic oxide ($SnO_2$) and a reasonable reactive compound (e.g., oxides, hydroxides, carbonates) of calcium and/or strontium as the starting raw materials. In the preferred method of formulation, the alkaline earth compound used is the carbonate, which is readily commercially available at relatively low cost and in suitable purity. It is pointed out that there is some uncertainty and conflict of opinion on the stability and separate existence of lead stannate; therefore, it is to be understood that the lead stannate component specified may be lead oxide (PbO) and tin oxide ($SnO_2$) in the stoichiometric proportions (a molar ratio 1:1) indicated by the empirical formula $PbSnO_3$. It is further pointed out that the weight percentages of ingredients hereinafter stated are calculated on the basis of their respective oxides.

The most satisfactory method as yet devised for preparing the ceramic compositions embraced by the present invention will now be described as applied to the making of ceramics consisting essentially of lead zirconate and lead titanate with strontium additions. It will be appreciated, however, that many variations in technique may be availed of without departing from the scope of the invention and that the same techniques may be applied to all formulations described herein.

The starting materials, viz., lead oxide (PbO), zirconia, titania, and strontium carbonate, all of relatively pure grade (e.g., C.P. grade) are combined and wet or dry milled to achieve thorough mixing and particle size reduction. In milling the mixture care should be exercised to avoid, or the proportions of ingredients varied to compensate for, contamination by wear of the milling balls or stones. Thus, for example, if titania balls are used in the mill, their weight loss should be empirically determined and the proportions of the mixture adjusted (in this case by decreasing the titania) to allow for the titania introduced through ball wear. The invention, however, is not concerned with the specific means or methods by which the proper proportions in and reproducibility of the final product are achieved and accordingly the ranges given in this description and in the subjoined claims are those desired or intended, exclusive of impurities in the raw materials, assuming that suitable precautions are taken in the preparation to avoid, control and/or compensate for contamination.

After the first milling, the mixture is dried (if wet milled) and reground briefly to assure as homogeneous a mixture as possible. Thereafter, the mixture, either loose or suitably formed into desired shapes is pre-reacted by sintering at a temperature of around 850° C. for approximately 2 hours. It is desirable to control loss of lead during the heating by suitable means, such as by carrying out the sintering in an enclosure containing a source of lead oxide vapor as indicated in the aforementioned U.S. Patent No. 2,708,244. The specific conditions of sintering will, of course, depend on such variable factors as the size and shape of the batch, and may be selected in accordance with established ceramic techniques to suit the particular case, the object being to approach, as closely as possible, a complete or 100% reaction of the mixture.

Following the pre-sintering, the reacted material is allowed to cool and is then crushed and milled to a small particle size. Once again, suitable precautions should be exercized to avoid, control and/or compensate for ball wear contamination during milling. When milling is completed, the pre-sintered mixture is ready for forming into the desired shapes and firing to maturity. Depending on preference and the shapes desired, the material may be formed into a mix or slip suitable for pressing, slip casting, or extruding, as the case may be, in accordance with conventional ceramic procedures.

The samples for which data are given hereinbelow were prepared by admixing with 100 grams of the milled pre-sintered mix, 3 cc. of a bonding and lubricating agent consisting of equal parts by volume of water and Ceremul C. Ceremul C is a commercially available product consisting of an aqueous dispersion (41 to 46% solids) of paraffin (M.P. 122° F.). The mix was then pressed into discs, roughly 1-inch in diameter and 2 to 3 mm. thick, which were fired to maturity at a temperature around 1280° C. for about 45 minutes, with suitable precautions taken to avoid or control loss of lead components through volatilization.

The fired shapes are then polarized in the usual way, for example, by applying a pair of electrodes (e.g., 14, 16, Figures 1 and 2) to opposite faces of the ceramic bodies and applying an electrostatic field to the electrodes. While the particular conditions of polarization may be varied as desired, D.C. field strengths of 150 to 175 volts per mil, at room temperature, sustained for one hour have given satisfactory results. Another method of polarizing, utilized to pole the ceramic bodies on which data are hereinafter presented, is disclosed and claimed in an application for Letters Patent, Serial No. 527,712, filed concurrently with and assigned to the same assignee as the present invention.

The general empirical formula for compositions according to the invention may be expressed $$Pb_ASr_BCa_C(Zr_XTi_YSn_Z)O_3$$

wherein A, B, C, X, Y and Z (subscripts) represent the mole fraction or atom percent of the respective component symbols with which each is associated and have the numerical values:

$A$=0.99 to 0.70
$B$=0.01 to 0.30
$C$=0.01 to 0.30
$B+C$=0.01 to 0.30
$X$=0 to 0.90
$Y$=0.10 to 0.60
$Z$=0 to 0.65 and $$A+B+C=X+Y+Z=1.00$$

Within the operative ranges of proportions and materials described above, the preferred compositions from the standpoint of having a high piezoelectric response coupled with high relative permittivity are those having the specific formulae:

(1) $Pb_{.95}Sr_{.05}(Zr_{.53}Ti_{.47})O_3$
(2) $Pb_{.875}Sr_{.125}(Zr_{.54}Ti_{.46})O_3$
(3) $Pb_{.925}Sr_{.075}(Zr_{.53}Ti_{.47})O_3$

The constituency of these and other exemplary compositions in terms of the percentage weights of the component oxides is given hereinafter in Table II.

As will be seen from Table I hereinbelow, a composition (Example 1) having formula (1), above, has after polarization, a relative dielectric constant (K) of 840 as compared to 600 for plain (i.e., unmodified) lead zirconate-titanate having the same zirconate:titanate ratio. This marked increase in permittivity is accompanied by a rise in the mechanical Q of the disc from 200 to 600 and without any decrease in electromechanical coupling as indicated by the radial coupling coefficient ($k_r$) which is the same (.51) for both the unmodified lead zirconate-titanate and Composition 1.

An even greater increase in permittivity over unmodified lead zirconate-titanate is exhibited by the Formula 2 composition (Example 6, Table I) which has a relative dielectric constant of 1300 after polarization. This high dielectric constant is attained at the cost of a slightly lower coupling ($k_r$=.50) and a lower gain in mechanical Q of the disc ($Q_{disc}$=370).

The Formula 3 composition (Example No. 2, Table I) has both a much higher relative dielectric constant ($K$=1000) and mechanical Q ($Q_{disc}$=500) than plain lead zirconate-titanate but again these gains are at the expense of a slight lowering ($k_r$=.48) of the radial coupling.

Other data on polarized discs of the above and other preferred compositions at room temperature are set forth in Tables I and II which follow presently and in which the various constants, coefficients and moduli are defined as follows:

K—Relative dielectric constant; permittivity of the material relative to permittivity of space.
$k_r$—Radial piezoelectric coupling coefficient.
$Y_{11}^e$—Young's modulus, newtons/m.$^2$.
$d_h$—Hydrostatic piezoelectric charge output coefficient, $\times 10^{-12}$, coulombs/newton.
$d_{31}$—Piezoelectric charge output coefficient (with axis of stress perpendicular to axis of polarization), $\times 10^{-12}$, coulombs/newton.
$d_{33}$—Piezoelectric charge output coefficient (with axis of stress coincident with axis of polarization), $\times 10^{-12}$, coulombs/newton.
$g_{31}$—Piezoelectric voltage output coefficient (with axis of stress perpendicular to axis of polarization), $\times 10^{-3}$, volt meter/newton.
Mechanical Q—A constant times the ratio of mechanical energy stored per cycle to mechanical energy dissipated per cycle.

*Table I*

| Example No. | Empirical Formula of Composition | Relative Dielectric Constant K | Radial Coupling $k_r$ | Young's Modulus $Y_{11}^e$, newtons/meter $^2$ | Mechanical Q (of thin disc) |
|---|---|---|---|---|---|
| 0 | $Pb(Zr_{.53}Ti_{.47})O_3$ | 600 | .51 | 8.0 | 200 |
| 1 | $Pb_{.95}Sr_{.05}(Zr_{.53}Ti_{.47})O_3$ | 840 | .51 | 7.75 | 600 |
| 2 | $Pb_{.925}Sr_{.075}(Zr_{.53}Ti_{.47})O_3$ | 1,000 | .48 | 7.95 | 500 |
| 3 | $Pb_{.90}Sr_{.10}(Zr_{.53}Ti_{.47})O_3$ | 1,080 | .46 | 8.15 | 415 |
| 4 | $Pb_{.85}Sr_{.15}(Zr_{.53}Ti_{.47})O_3$ | 1,130 | .41 | 7.8 | 350 |
| 5 | $Pb_{.80}Sr_{.20}(Zr_{.53}Ti_{.47})O_3$ | 1,130 | .32 | 7.05 | 330 |
| 6 | $Pb_{.875}Sr_{.125}(Zr_{.54}Ti_{.46})O_3$ | 1,300 | .50 | 8.0 | 370 |
| 7 | $Pb_{.975}Sr_{.025}(Zr_{.54}Ti_{.46})O_3$ | 650 | .50 | 8.0 | 200 |
| 8 | $Pb_{.95}Ca_{.05}(Zr_{.54}Ti_{.46})O_3$ | 980 | .45 | 7.75 | 550 |
| 9 | $Pb_{.97}Ca_{.03}(Zr_{.53}Ti_{.47})O_3$ | 986 | .46 | (*) | (*) |
| 10 | $Pb_{.98}Ca_{.02}(Zr_{.53}Ti_{.47})O_3$ | 892 | .47 | (*) | (*) |

*Not determined.

*Table II*

| Example No. | Empirical Formula of Composition | Weight Percent of Components Computed as Oxides | | | | | | Piezoelectric Coefficients | | | |
|---|---|---|---|---|---|---|---|---|---|---|---|
| | | | | | | | | coulombs/newton | | | volt meters/newton |
| | | PbO | SrO | CaO | $ZrO_2$ | $TiO_2$ | $SnO_2$ | $d_{31}$ | $d_{33}$ | $d_h$ | $g_{31}$ |
| 0 | $Pb(Zr_{.53}Ti_{.47})O_3$ | 68.44 | ------ | ------ | 20.05 | 11.51 | -------- | −77.5 | 190 | 35 | 14.6 |
| 1 | $Pb_{.95}Sr_{.05}(Zr_{.53}Ti_{.47})O_3$ | 66.25 | 1.62 | ------ | 20.40 | 11.73 | -------- | −93 | 221 | 35 | 12.5 |
| 2 | $Pb_{.925}Sr_{.075}(Zr_{.53}Ti_{.47})O_3$ | 65.11 | 2.45 | ------ | 20.59 | 11.85 | -------- | −94.5 | 225 | 36 | 10.7 |
| 3 | $Pb_{.90}Sr_{.10}(Zr_{.53}Ti_{.47})O_3$ | 63.95 | 3.29 | ------ | 20.80 | 11.96 | -------- | −94.5 | 225 | 36 | 9.9 |
| 4 | $Pb_{.85}Sr_{.15}(Zr_{.53}Ti_{.47})O_3$ | 61.59 | 5.03 | ------ | 21.19 | 12.19 | -------- | −87 | 219 | 45 | 8.7 |
| 5 | $Pb_{.80}Sr_{.20}(Zr_{.53}Ti_{.47})O_3$ | 59.11 | 6.85 | ------ | 21.60 | 12.44 | -------- | −70 | 193 | 53 | 7.0 |
| 6 | $Pb_{.875}Sr_{.125}(Zr_{.54}Ti_{.46})O_3$ | 62.68 | 4.15 | ------ | 21.37 | 11.80 | -------- | −112 | (*) | (*) | 9.75 |
| 7 | $Pb_{.975}Sr_{.025}(Zr_{.54}Ti_{.46})O_3$ | 67.29 | 0.79 | ------ | 20.57 | 11.35 | -------- | −79 | (*) | (*) | 13.8 |
| 8 | $Pb_{.95}Ca_{.05}(Zr_{.54}Ti_{.46})O_3$ | 66.68 | ------ | 0.88 | 20.90 | 11.54 | -------- | −88.5 | (*) | (*) | 10.2 |
| 9 | $Pb_{.97}Ca_{.03}(Zr_{.53}Ti_{.47})O_3$ | 67.43 | ------ | 0.52 | 20.36 | 11.69 | -------- | (*) | (*) | (*) | (*) |
| 10 | $Pb_{.98}Ca_{.02}(Zr_{.53}Ti_{.47})O_3$ | 67.77 | ------ | 0.35 | 20.25 | 11.63 | -------- | (*) | (*) | (*) | (*) |

* Not determined.

From the foregoing tables it will be observed that, in all cases, compositions containing calcium or strontium exhibited a significantly higher relative permittivity than plain lead zirconate-titanate (Example 0) and, in most cases, higher piezoelectric charge output coefficients $d_{31}$, $d_{33}$, $d_h$ and mechanical Q. In certain instances these improvements are attained at the sacrifice of other properties, for example, by a somewhat lower radial coupling ($k_r$). This loss, however, is very slight in the majority of cases and of little or no consequence in certain applications. A further effect of the alkaline earth additions, not reflected in the tables, is the attainment of a lighter ceramic due, of course, to the lower molecular weight of the additions as compared to the lead which they substitute for. In addition, the novel compositions are characterized by low dissipation factor (less than 1%) and compare favorably with plain lead zirconate-titanate in aging properties, i.e., in their ability to retain indefinitely a high percentage of their original polarization.

While there have been described what at present are considered to be the preferred embodiments of the invention, it will be obvious to those skilled in the art that various changes and modifications can be made therein without departing from the invention, and it is aimed, therefore, in the appended claims to cover all such changes and modifications as fall within the true spirit and scope of the invention.

What is claimed is:

1. As a novel composition of matter, a solid solution consisting essentially of a material selected from the area ABCD of the diagram of Figure 3 and at least one alkaline earth element selected from the group consisting of calcium and strontium, said alkaline earth element being present as a substituent for approximately 1 to 30 atom percent of the lead in said material.

2. As a novel composition of matter, a ceramic solid solution consisting essentially of a material selected from the area EFGH of the diagram of Figure 3 and at least one alkaline earth element selected from the group consisting of calcium and strontium, said alkaline earth element being present as a substituent for approximately 1 to 30 atom percent of the lead in said material.

3. A dielectric ceramic body formed of a solid solution consisting essentially of lead zirconate, lead titanate and, substituted for from 1 to 30 atom percent of the lead in said zirconate and titanate, at least one alkaline earth element selected from the group consisting of calcium and strontium, the mole ratio of lead and alkaline earth zirconate to lead and alkaline earth titanate in said solid solutions being in the range from 65:35 to 45:55.

4. As a novel composition of matter, the heat reaction product of a mixture consisting essentially of lead oxide (PbO), zirconia, titania and a material selected from the group consisting of calcium and strontium and heat reactive compounds thereof, the mole ratio of zirconia to titania being in the range from 60:40 to 50:50 and the ratio of lead to alkaline earth metal, on an atom percentage basis, being in the range from 95:5 to 85:15.

5. A dielectric ceramic body composed of the heat reaction product of a mixture consisting essentially of lead oxide (PbO), zirconia, titania and at least one alkaline earth compound selected from the group consisting of the carbonates, oxides and hydroxides of calcium and strontium, the mole ratio of zirconia to titania being in the range 65:35 to 45:55 and the mole ratio of lead oxide to alkaline earth compound computed as the oxide being in the range 95:5 to 85:15.

6. As a novel composition of matter, the heat reaction product of a mixture of lead oxide (PbO), zirconia, titania and strontium carbonate, the mole ratio of zirconia to titania being in the range from 65:35 to 45:55 and the ratio of lead to strontium, on an atom percentage basis, being in the range from 95:5 to 85:15.

7. A piezoelectric ceramic material consisting essentially of a solid solution of lead zirconate, lead titanate and at least one alkaline earth element selected from the group consisting of calcium and strontium, said material having the compositional formula $$Pb_AM_B(Zr_XTi_Y)O_3$$

wherein: M represents the alkaline earth element the sum of A and B is unity and B has a value of from .05 to .15; and the sum of X and Y is unity and X has a value of from .45 to .65.

8. As a novel article of manufacture, an electromechanical transducer having an active element formed of a ceramic material defined in claim 7.

9. As a novel composition of matter, a piezoelectric ceramic material consisting essentially of a solid solution having the formula $$Pb, Sr(Zr, Ti)O_3$$

and wherein, on an atom percentage basis, the ratio Pb:Sr is in the range 95:5 to 85:15 and the ratio Zr:Ti is in the range 54:46 to 52:48.

10. As a novel composition of matter, a piezoelectric ceramic material consisting essentially of a solid solution having the following formula:

$$Pb_{.875}Sr_{.125}(Zr_{.54}Ti_{.46})O_3$$

11. As a novel composition of matter, a piezoelectric ceramic material consisting essentially of a solid solution having the following formula:

$$Pb_{.95}Sr_{.05}(Zr_{.53}Ti_{.47})O_3$$

12. As a novel composition of matter, a piezoelectric ceramic material consisting essentially of a solid solution having the following formula:

$$Pb_{.925}Sr_{.075}(Zr_{.53}Ti_{.47})O_3$$

13. As a novel article of manufacture, an electromechanical transducer comprising an electrically polarized ceramic body consisting essentially of a solid solution of the zirconate and titanate salts of lead and strontium, the mole ratio of zirconate to titanate salts being in the range 54:46 to 53:47 and the ratio, on an atom percentage basis of lead to strontium being in the range 95:05 to 85:15.

14. The heat reaction product of a mixture of oxidic lead, zirconium and titantium and also in oxidic form, at least one alkaline earth selected from the group consisting of strontium and calcium, said oxidic lead and alkaline earth being combined in solid solution with said zirconium and titantium in proportions corresponding to their respective zirconates and titanates, the ratio of zirconates to titanates, on a mole basis, being in the range from 90:10 to 40:60 and the ratio of lead to alkaline earth, on an atom percentage basis, being in the range of 99:1 to 70:30.

15. As a novel composition of matter, a solid solution having essentially the constituency indicated by the general empirical formula $Pb_ASr_BCa_C(Zr_XTi_YSn_Z)O_3$ wherein the subscripts denote atom percents and have the following values: $A$=0.99 to 0.70; $B$, $C$, $B+C$=0.01 to 0.30; $X$=0.90 to 0; $Y$=0.10 to 0.60; $Z$=0.00 to 0.65; $A+B+C=X+Y+Z=1.00$.

References Cited in the file of this patent

UNITED STATES PATENTS

| | | |
|---|---|---|
| 2,520,376 | Roup et al. | Aug. 29, 1950 |
| 2,525,627 | Wainer | Oct. 10, 1950 |
| 2,624,709 | Coffeen | Jan. 6, 1953 |
| 2,708,244 | Jaffe | May 10, 1955 |
| 2,721,182 | Clement | Oct. 18, 1955 |
| 2,735,024 | Kulcsar | Feb. 14, 1956 |

FOREIGN PATENTS

| | | |
|---|---|---|
| 167,987 | Austria | 1951 |
| 698,946 | Great Britain | 1953 |
| 1,059,648 | France | 1953 |
| 1,070,423 | France | 1954 |